(12) United States Patent
Bednarik et al.

(10) Patent No.: US 12,505,573 B2
(45) Date of Patent: Dec. 23, 2025

(54) GAZE TRACKING

(71) Applicant: SeeTrue Technologies Oy, Joensuu (FI)

(72) Inventors: Roman Bednarik, Joensuu (FI);
Kristian Lukander, Joensuu (FI); Piotr Bartczak, Joensuu (FI); Miika Toivanen, Joensuu (FI)

(73) Assignee: SeeTrue Technologies Oy, Joensuu (FI)

( * ) Notice: Subject to any disclaimer, the term of this patent is extended or adjusted under 35 U.S.C. 154(b) by 304 days.

(21) Appl. No.: 18/012,751

(22) PCT Filed: Jul. 1, 2021

(86) PCT No.: PCT/FI2021/050511
§ 371 (c)(1),
(2) Date: Dec. 23, 2022

(87) PCT Pub. No.: WO2022/003255
PCT Pub. Date: Jan. 6, 2022

(65) Prior Publication Data
US 2023/0252671 A1    Aug. 10, 2023

(30) Foreign Application Priority Data
Jul. 3, 2020    (FI) ..................... 20205723

(51) Int. Cl.
*G06T 7/73*    (2017.01)
*G06T 7/62*    (2017.01)

(52) U.S. Cl.
CPC .................. *G06T 7/73* (2017.01); *G06T 7/62* (2017.01); *G06T 2207/10048* (2013.01); *G06T 2207/30196* (2013.01)

(58) Field of Classification Search
CPC ... G06T 7/73; G06T 7/62; G06T 2207/10048; G06T 2207/30196; G02B 21/365;
(Continued)

(56) References Cited

U.S. PATENT DOCUMENTS 10,698,204 B1    6/2020    Ouderkirk et al.
10,698,481 B1    6/2020    Najafi Shoushtari et al.
(Continued)

FOREIGN PATENT DOCUMENTS

JP    H11290276 A    10/1999
WO    WO0026713 A1    5/2000
(Continued)

OTHER PUBLICATIONS

Shahram et al., ("Embedding an Eye Tracker into a Surgical Microscope: Requirements, Design, and Implementation", IEEE sensors Journal, vol. 16, No. 7, Apr. 2016, pp. 2070-2078) (Year: 2016).*
(Continued)

*Primary Examiner* — Amara Abdi
(74) *Attorney, Agent, or Firm* — Laine IP Oy

(57) ABSTRACT

According to an example aspect of the present invention, there is provided a near-eye ocular device, the near-eye ocular device comprising an ocular pathway enclosed by an enclosure, comprising at least one light emitter, configured to illuminate an eye of a user to produce corneal glints on the eye when the user is using the near-eye ocular device, and at least one sensor configured to obtain an image of the eye of the user when the user is using the near-eye ocular device.

14 Claims, 9 Drawing Sheets

(58) Field of Classification Search
CPC .. G02B 25/001; G02B 27/0093; G02B 25/00; G06F 3/013; G06F 3/0304; A61B 3/113
See application file for complete search history.

(56) References Cited

U.S. PATENT DOCUMENTS

| | | | |
|---|---|---|---|
| 10,761,602 B1* | 9/2020 | Sharma | G06V 40/18 |
| 11,116,395 B1* | 9/2021 | Gur | A61B 3/113 |
| 2009/0058660 A1 | 3/2009 | Torch | |
| 2013/0010097 A1 | 1/2013 | Durnell et al. | |
| 2018/0218211 A1 | 8/2018 | Ishioka et al. | |
| 2019/0019023 A1 | 1/2019 | Konttori et al. | |
| 2019/0391642 A1* | 12/2019 | Eil | G02B 23/10 |
| 2021/0325649 A1* | 10/2021 | Segev | A61B 3/0008 |

FOREIGN PATENT DOCUMENTS

| | | |
|---|---|---|
| WO | WO2019086759 A1 | 5/2019 |
| WO | WO2019226187 A1 | 11/2019 |
| WO | WO2019228634 A1 | 12/2019 |

OTHER PUBLICATIONS

Eivazi et al: Embedding an Eye Tracker Into a Surgical Microscope: Requirements, Design, and Implementation. IEEE Sensors Journal, IEEE Service Center, Apr. 1, 2016, vol. 16, No. 7, pp. 2070-2078.

* cited by examiner

GAZE TRACKING

FIELD

The present disclosure relates to gaze tracking, also known as eye tracking.

BACKGROUND

Determining what a user looks at is of interest in a number of different fields. For example, a disabled person may be equipped with a gaze tracker enabling her to input characters to form words and sentences. As another example, an ambulance driver may be enabled to safely operate equipment of his ambulance or a nuclear power station operator may have his gaze tracked to detect episodes of fatigue during a shift.

Gaze tracking may be performed based on a number of different techniques, which have as a common feature that the direction of one eye, or both eyes, is measured to obtain input information to the gaze tracking system to control a device, for example.

SUMMARY

According to some aspects, there is provided the subject-matter of the independent claims. Some embodiments are defined in the dependent claims.

According to a first aspect of the present disclosure, there is provided a near-eye ocular device, the near-eye ocular device comprising an ocular pathway enclosed by an enclosure, comprising at least one light emitter, configured to illuminate an eye of a user to produce corneal glints on the eye when the user is using the near-eye ocular device, and at least one sensor configured to obtain an image of the eye of the user when the user is using the near-eye ocular device.

EMBODIMENTS

Disclosed herein are arrangements to obtain eye tracking in near-eye ocular devices such as, for example, microscopes and/or binoculars. In general, ocular devices are devices which present information to the user from near-the-eye optical surfaces. For example, near-the-eye may mean that the nearest optical surface is two centimetres or less from the eye(s) during use, for example. These devices may be monocular or binocular. Using various arrangements of illumination and sensor placement, results sufficiently accurate for various uses may be obtained, as will be described herein below. In general, by eye tracking in a near-eye ocular device it is meant determining what the user's gaze is directed at via an ocular pathway of the near-eye ocular device. For example, this may mean determining which part of a sample plate the user is looking at through a microscope.

Figure 1:
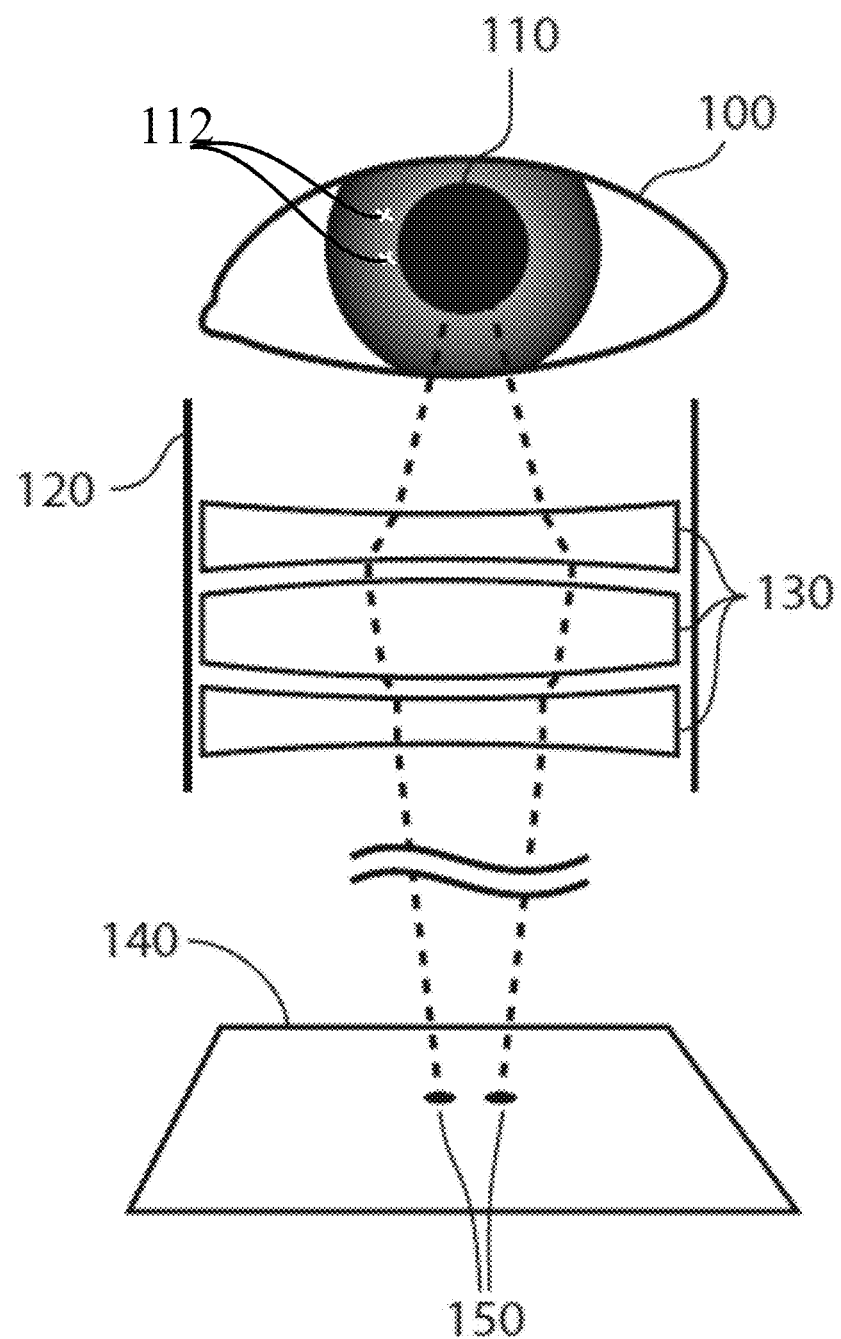
FIG. 1 illustrates an example system in accordance with at least some embodiments of the present invention.

FIG. 1 illustrates an example system in accordance with at least some embodiments of the present invention. FIG. 1 illustrates a schematic example system. Illustrated is a user's eye 100, which comprises the pupil 110. In the example of FIG. 1, the user uses a microscope 120, which is an example of a near-eye ocular device, which is a near-to-eye optical device. Microscope enclosure 120 comprises a plurality of optical components such as, but not limited to, lenses, filters, beam splitters, reflectors, polarizers, prisms, light guides and/or mirrors, which are schematically illustrated using reference number 130. Which optical components 130 are included depends on the application, for example a pathologist's microscope has a larger magnification requirement than a microscope designed to study entire insects, or numismatics. A sample is visible through the microscope on plate 140. Plate 140 may be of glass, for example, enabling illumination of the sample from below. Two possible gaze targets 150 are schematically illustrated on plate 140.

An ocular pathway is schematically indicated in FIG. 1 using dotted lines, this pathway traversing an enclosure 120 of the near-eye ocular device. The ocular pathway extends in the enclosure in the same direction as the axis of the enclosure. The ocular pathway does not necessarily need to be straight, rather, depending on the nature of the near-eye ocular device, the ocular pathway may have bends, or be guided, proceeding in the enclosure which has corresponding bends.

Tracking the gaze of a user of a microscope gives valuable information concerning how the user observes the sample under study, for example which parts of the sample the user focuses on, for how long the user remains focused on each part of the sample and what kind of gaze strategy the user uses.

In addition, the pupil size may be estimated. This information may be used to estimate the pupillary response, user's awareness, workload and level of expertise, in educational purposes, and in assisting annotation of image areas. Gaze information may be used in controlling the functioning of an optical device, such as a microscope, for example. Thus manual controlling may be reduced. The relative pupil size may be inferred in image units (pixels) using the eye image alone, or in real-world units, for example square millimetres, by using the eye image and information provided by glints on the corneal surface, for example. Other features of the eyes, such as iris, iris color and pattern, eyelids, eyelids characteristics, blink and blinks characteristics can also be estimated, for the purposes including, but not limited to, eye tracking, user state monitoring, and user identification. Glints 112 are illustrated in FIG. 1.

A pathologist or laboratory worker may also use his gaze point on a sample plate to guide the microscope to move the sample. As a further example, a digital viewfinder may provide a visual indication when the user is looking at a target which may be a human, for example when the ocular device in question is binoculars. Further, a sample may be automatically associated, based on the gaze point identification, with metadata indicating an extent to which it has been analysed, for example, whether a threshold has been reached. An example is a sample which must be analysed at least as to 70% of its contents. In case data is stored, a pathologist may track his data of a previous examination to determine, which areas of sample were looked at to arrive at a decision concerning the sample.

In the system of FIG. 1, a sensor in the form of an eye-tracking camera, which is not shown for the sake of clarity, is configured to image eye 100. The eye-tracking camera may image eye 100 from below or from other orientations, as will be described herein below. The eye may be illuminated for this purpose by at least one emitter of light, for example visible light or infra-red, IR, light. The emitter(s) may comprise light-emitting diodes, LEDs, and/or laser emitters, for example. An advantage of IR lights is that the human eye does not detect it, making the light unobtrusive to the user. IR light also allows for filtering out lighting and reflections of visible light sources the user is looking at or which are visible in the environment, helping to control the lighting scheme. The corneal shape of the user's eye enables extracting information on the location and direction the eye is turned to, based on glints of the lights on the moist surface of the eye. The eye-tracking sensor, such as, for example, a camera sensor, which is enabled to capture images of the user's eye may be based at least partly on charge-coupled device, CCD, technology, complementary metal-oxide semiconductor, CMOS, technology, and/or photosensitive photodiodes, for example, to produce a digital video or still image of the eye, or in general still data of the eye which characterizes locations of the glints. Such digital video or still image of the eye may include reflections, glints, of the light emitter(s).

Likewise in the system of FIG. 1, a scene camera—not seen in the figure for the sake of clarity—may be arranged to image plate 140. The scene camera may likewise be based on CCD or CMOS technology, for example, to produce digital video or still image of the sample. The scene camera and the eye-tracking camera may be synchronized with each other to produce time-aligned images of eye 100 and plate 140.

In gaze tracking in general, a transformation may be determined from a coordinate system of an eye-tracking sensor to a coordinate system of a scene camera. The transformation may be initialized using a calibration procedure. The eye-tracking sensor may be assisted by light emitters to generate glints 112 and illuminate the eye, as described above, to enable determining a direction where the eye is turned toward. In an ocular device, the presence of optical equipment 130 may make it more difficult to accurately project a gaze point into a scene camera's coordinates. Solutions described herein facilitate overcoming these difficulties.

Some gaze tracking solutions are sensitive to movement of the user's head relative to the eye-tracking camera. In these cases, if the user moves after calibrating the eye tracking system, the gaze-tracking results may be inaccurate. Similarly, if the optical device in question moves during operation, it may result in a similar misalignment error. A typical usage session of an ocular device contains constant small head movements for adjusting the viewing angle, or head movement due to the user leaving the operational position to view objects outside the ocular view and returning to it. Inaccuracy resulting from such head movement affects the accuracy of gaze tracking, which is not the case with wearable devices utilizing eye-tracking systems like eye-tracking glasses, VR, AR, XR devices, where the display surface is fixedly attached to the viewer's face. Selecting optimal placements for the light emitter(s) and/or the eye tracking sensor(s) may help in reducing these inaccuracies by adapting these placements to the way that the user is using the device.

Gaze tracking for ocular devices, such as microscopes and binoculars, has features that are not shared within most other gaze tracking solutions, such as the nature of the viewed information, very near-to-the eye optical constructs (the ocular), free user movement in and out of the gaze tracker's target area, variable illumination in the use environment ranging from labs to operating rooms to outside in-the-wild use scenarios, and various lighting conditions through the optical system itself, such as back-lighted microscope plates or aiming binoculars toward brightly lit areas.

Corneal-reflection based eye tracking solution integration with an ocular system is not straightforward due to the limited size of the ocular pathway, optical restrictions of the assembly affecting placement possibilities of the eye-tracking emitter(s) and sensor(s) of arbitrary location and shape. For example, a sensor configured to obtain images of the eye(s) needs to be located in such a location, that an optimal uninterrupted view of the eye is possible, while the illumination emitter(s) need to be positioned at such locations as to ensure that the generated light reaches the surface of the eye to create the so-called glints, which need to be visible to the sensor(s), while keeping the radiance within eye safety limits.

At least some of the solutions disclosed herein enable variable placement of the sensor(s) and the emitter(s), according to the use case, the general geometry of the ocular system, viewing conditions, user pose and possibly also according to other reasons. Thus, an optimal placement of the sensor(s) and/or emitter(s) may be selected, for example based on whether the near-eye ocular device is used to view targets close to the user or further away. In some embodiments, an emitter is formed from a surface of the optical element of the ocular device closest to the user's eye. In this case, this surface may be used to reflect or pass through light, such as IR laser light, from the emitter(s) to the eye.

As such, an optical imaging and sensing apparatus may include, for one or more ocular pathways separately, 1) one or more illumination units, emitters, containing one or more sources of infrared or near-infrared light or other assembly for light emission, wherein the illumination may also or alternatively be created from the surface of the last optical element of the ocular device, 2) one or more sensors or other capturing apparatuses configured to capture images of the eye and the reflected light in the said illumination spectrum, and, optionally, 3) one or more reflective surfaces positioned in the ocular pathway so that the user's eye is visible to the said sensor, the reflective surfaces configured so that they do not obstruct view to the object, and/or to not affect optical properties of object as viewed through the ocular pathway. Light emitted by the one or more illumination units may have a variable wavelength. By this it is meant a wavelength which may be selected from an available range of wavelengths the illumination unit can produce.

Using the method disclosed herein, the sensor(s) may be placed a) within the ocular enclosure, in the line-of-sight of the user, or via a hot mirror at an angle, which is preferably 45 degrees, and can be modified according to the space available in the enclosure between the relevant optical elements, b) next to the ocular enclosure, viewing the user's eye directly at an angle, or c) next to the ocular, viewing the eye through a reflector the angle of which may be varied to adjust system height. Reflectors may comprise, for example, stable or movable optical elements such as lenses, light guides, mirrors, freeform optics, micro/nano-structured films, liquid-crystal, micro-electro-mechanical systems, MEMS, including DMD, Digital micromirror device, or other displays, diffusing elements and optical combiners.

The lighting arrangement necessary, that is the emitter(s), may be included within the ocular enclosure, for example at the inner sides of the enclosure, or on top of the ocular enclosure, near the eye surface.

The arrangements described herein allow embedding the eye-tracking hardware (the sensor(s), the emitter(s)) to a near-eye ocular device in such a way that they don't interfere with normal work with the near-eye ocular device, for example by not restricting a field of view and allowing the user to wear corrective lenses and other eye-wear.

The described system provides a complete system for robust gaze tracking on ocular devices. The system allows free user movement in and out from the gaze tracker image, and while viewing through the ocular system. The system allows for tracking gaze in monocular, binocular, and stereo ocular systems. Arrangements described herein allow accurate eye direction tracking using the so-called pupil-corneal reflection eye-tracking method, and also other eye tracking methods.

Figure 2:
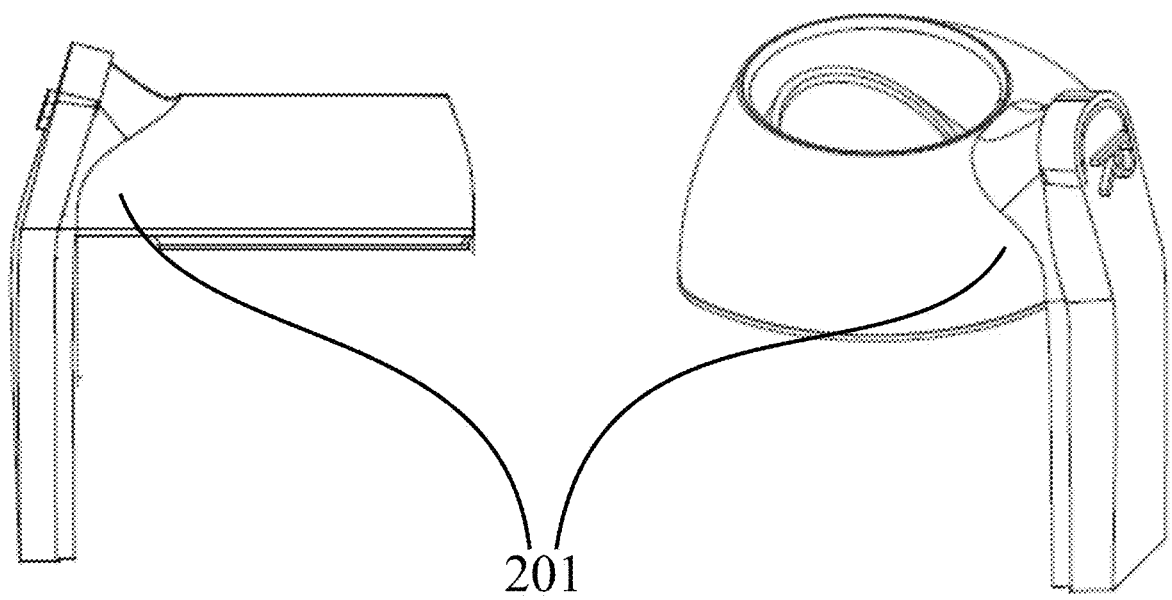
FIG. 2 comprises three views of an ocular element for use with at least some embodiments of the present invention.

FIG. 2 comprises three example views of an ocular element for use with at least some embodiments of the present invention. On the top row are disposed two wire drawings of an ocular element, which may be placed as part of an add-on near-eye ocular device. This ocular element is a housing configured to accept emitter(s) of light in a position therein marked with reference number 201. This, or these, emitter(s) are not on the line of sight, that is the ocular pathway enclosed by an enclosure of the ocular device, but are positioned to illuminate the eye to produce thereon glints, for example in the IR or near-IR wavelength region. In other words, the emitters in the ocular element of FIG. 2 are not inside the enclosure of the ocular device which encloses the ocular pathway. The ocular element, housing, of FIG. 2 does, on the other hand, protect the eye from stray light, including stray IR light which enhances the sharpness of the IR glints on the user's eye.

In general, there is provided a near-eye ocular device, comprising an ocular pathway enclosed by an enclosure, at least one light emitter, configured to illuminate an eye of a user when the user is using the near-eye ocular device, and at least one sensor configured to obtain an image of the eye of the user when the user is using the near-eye ocular device. The near-eye ocular device may comprise, or be used with, a computing element, such as the device of FIG. 3, configured to calculate estimates of the user's gaze direction based on inputs from the at least one sensor. A calibration process may be used to initialize the gaze tracking procedure. In some embodiments, there are at least two light emitters. In some embodiments, the disclosed eye tracking functionality is provided as a kit which may be installed on an already existing near-eye ocular device. In some embodiments, there are at least two sensors. An advantage of using two sensors is that they enable stereo imaging of the eye, which includes depth sensing. This enhances the ability of the eye tracking arrangement to determine the direction where the eye is turned, which increases the accuracy of eye tracking.

Each of the at least one light emitter is an infra-red or near-infra-red light emitter. For example, the emitter(s) may comprise LED, laser diode, LD, fluorescent dyes or laser emitters. The emitter(s) may emit light via mirrors, beam splitters, filters or MEMS elements. The at least one light emitter may comprise plural light emitters arranged into a preconfigured pattern. The at least one light emitter may comprise at least one light emitter with a tuneable wavelength of emitted light and/or it's radiant power may be selectable. Where plural emitters are used, they may emit light of plural different wavelength ranges, such as plural infra-red wavelength bands. The at least one light emitter may comprise plural light emitters, the plural light emitters comprising at least two subsets of light emitters, the subsets being independently controllable to be ON or OFF. By tuning the wavelength and/or selectively activating only a part of the emitters, the system may obtain a more dynamic understanding of the contour and/or features of the eye, or obtain a more robust behaviour toward partial occlusions of the features due to eye lids of viewing angles. For example, if the glints appear to indicate an ambiguous gaze direction, the system may slightly change the wavelength and/or switch different ones of the emitters on, to resolve the ambiguity. Emitters may be configurably operated on continuous mode, strobe more, with all emitters on at the same time, of subdivided into subgroups of emitters which are independently controllable, such that a part of the emitters may be ON and the rest OFF at a given time. The radiance of the emitters may be controllable, for example for eye safety, energy conservation (ON only when the eye is present), to enhance trackable features or to improve sensor data quality. For example, if at least one glint is faintly visible, the respective emitters may be controlled to increase their radiance to strengthen the glint or/and lighting uniformity, and once the glint is no longer faint due to eye movement, the radiance may be preserved back.

The sensor(s) may comprise imaging sensor(s), photosensitive element(s) (photodiode, photoresistors, semiconductor light source), thermal sensor(s) (including MEMS), proximity sensor(s) (ultrasonic, light-based), spectral sensor(s), snapshot sensor(s), array of sensors, and/or 3D sensor(s). The sensor(s) may be sensitive to light of a specific wavelength range. The sensor(s) may have adjustable wavelength ranges, for example by suitable filters, or, alternatively, different sensors may be sensitive to different wavelengths.

Sensor(s) may be of: the same group of sensors, various type of groups. Sensor(s) may work in: continuous mode, strobe mode, synchronized with other sensors and/or illuminator(s) and/or third-party devices, can be ON/OFF when an eye is present for energy conservation.

The near-eye ocular device may be configured to support the at least one light emitter and/or the at least one sensor in more than one location, enabling selection of the location(s) of the at least one light emitter and/or at least one sensor, for example according to a way the device is going to be used to optimize performance. In some embodiments, alternatively to, or in addition to, changing the location, a sensor and/or emitter may be rotated.

Figure 3:
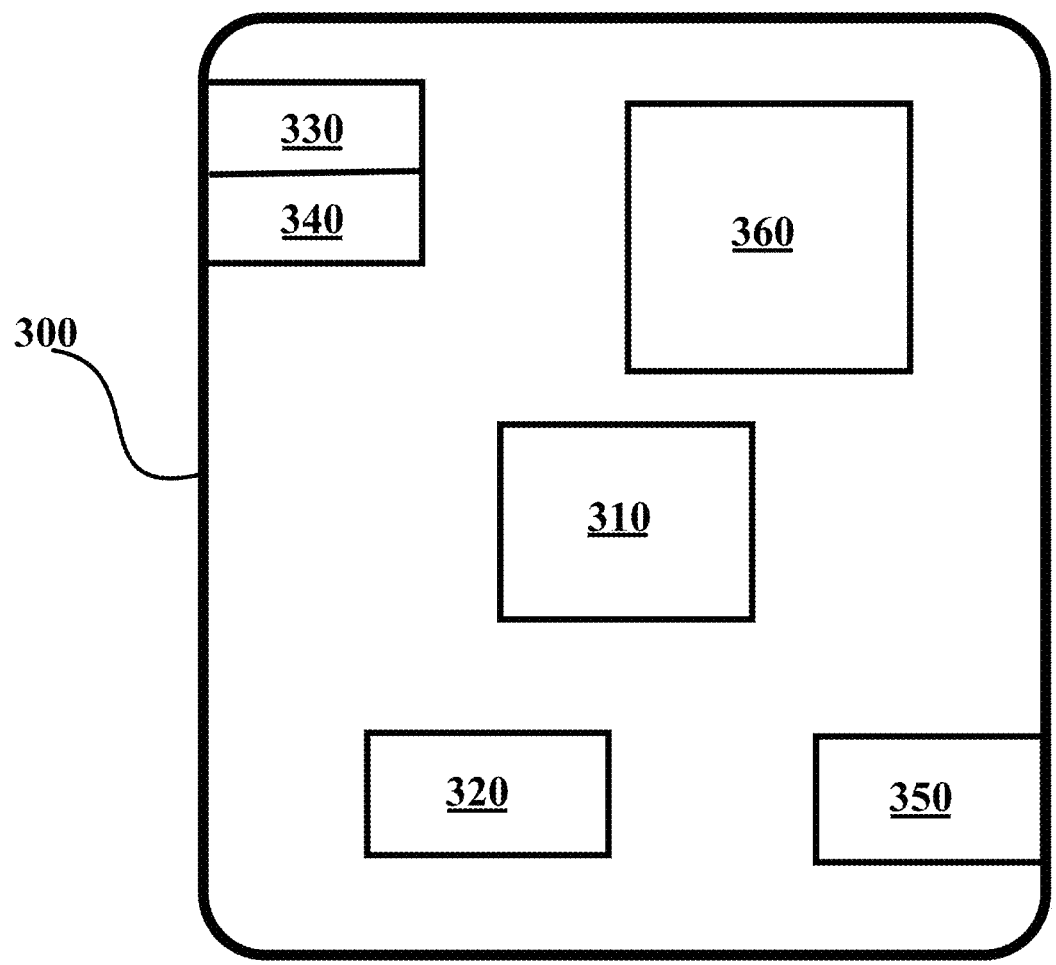
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a computing element of an eye tracking device. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Steamroller processing core designed by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA.

Device 300 may comprise memory 320. Memory 320 may comprise random-access memory and/or permanent memory. Memory 320 may comprise at least one RAM chip. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one standard. Device 300 may comprise a near-field communication, NFC, transceiver 350. NFC transceiver 350 may support at least one NFC technology, such as NFC, Bluetooth, Wibree or similar technologies. Information may be received in device 300, for example, from a sensor, or sensors, configured to obtain information from one or both of a user's eyes.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360. For example, the user may configure gaze tracking parameters via UI 360.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Processor 310, memory 320, transmitter 330, receiver 340, NFC transceiver 350 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

In general, an information processing device such as device 300 may be used to determine where the user is looking at through the near-eye ocular device. The device would take as inputs the output of the eye-tracking sensor(s) and, optionally, also the scene camera output, and output an estimate of where the user's eye(s) is (are) looking at. The device could use a transformation initialized using a calibration process, for example, as described above.

FIGS. 4A-4K each illustrates an example arrangement in accordance with at least some embodiments of the present invention.

Figure 4A:
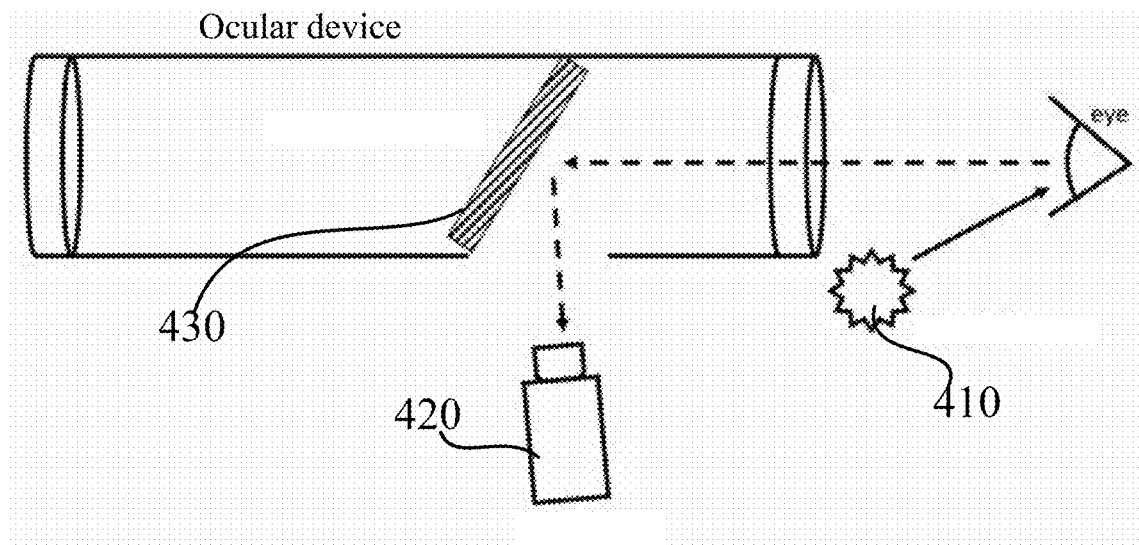
FIGS. 4A-4L each illustrates an example arrangement in accordance with at least some embodiments of the present invention.

In the arrangement of FIG. 4A, the emitter 410 and the sensor 420 are both outside the enclosure of the optical device. The enclosure is visible as a cylindrical surface enclosing the ocular pathway, which extends inside the enclosure and co-axially with the enclosure. Emitter 410 is arranged, at the eyepiece, to illuminate the surface of the user's eye directly, and the eye image and the glints on the surface of the eye are provided to sensor 420 via a reflective element 430, which may be transparent to visible light, for example. Reflective element 430 may be referred to as a reflector. Sensor 420 is thus configured to image the eye via the ocular pathway of the ocular device. Advantages of the arrangement of FIG. 4A include that both emitter 410 and sensor 420 are easily replaceable, as replacing them does not necessitate opening the enclosure of the ocular device. Further, having sensor 420 outside the enclosure enables for the camera to be moved as close to the lens as possible to minimize image distortions. Thus a location of the sensor with respect to the enclosure may be selected by the user and/or automatically based on the nature of the work the user is doing with the ocular device. The near-eye ocular device may correspondingly be configured to support sensor 420 at more than one distance from the enclosure during use.

Figure 4B:
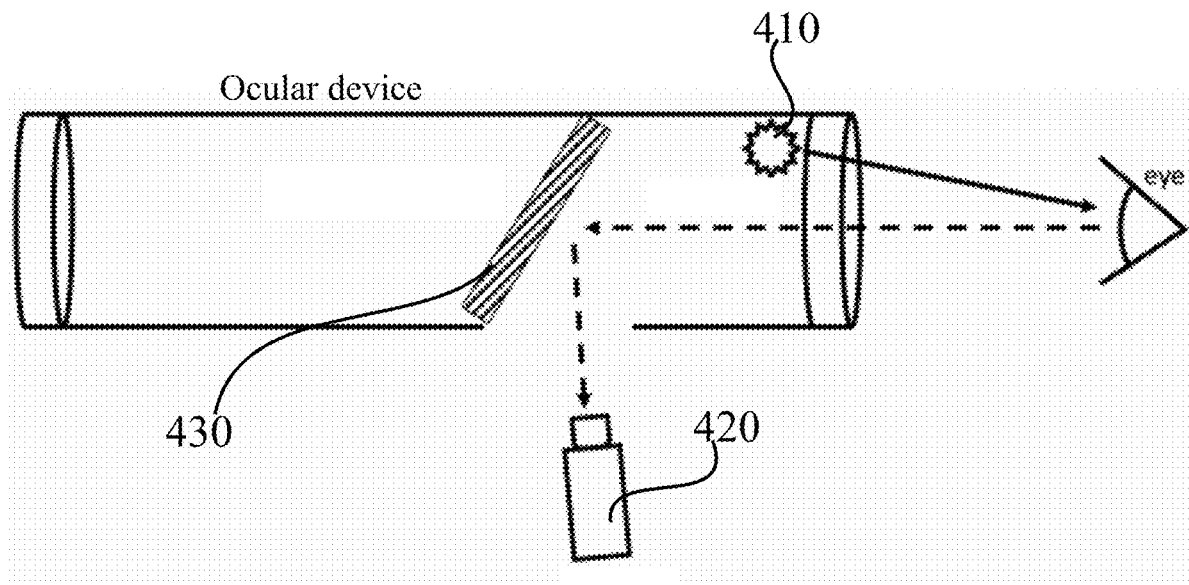

In the arrangement of FIG. 4B, the emitter 410 is inside the enclosure, while the sensor 420 is outside the enclosure, as in FIG. 4A. Placing the emitter 410 inside the enclosure, as illustrated, provides the benefit that the eye may be placed nearer to the end of the enclosure, and the emitter is less prone to mechanical damage. An apparatus may be configured to receive the emitter 410 either in the position of FIG. 4A or in the position of FIG. 4B, such that the user can select the position of the emitter by attaching the emitter to attachments provided in the ocular device. The enclosure may have an opened, or openable, slot to enable insertion of the emitter 410 to the position illustrated in FIG. 4B. Thus also the position of the emitter 410 may be adapted based on the nature of the work to be done with the ocular device, in addition to, or alternatively to, adapting the position of the sensor. In some embodiments, emitter 410 may be infused inside an optical element of the near-eye ocular device. For example, a light-emitting diode, LED, light source may be integrated in a lens by printing the LED emitter when constructing the lens using additive manufacturing. This applies not only to FIG. 4B but also in connection with, for example, FIG. 4G or 4H.

In general, and not only specifically to FIG. 4B, emitter 410, although illustrated as a single emitter, may comprise plural emitters, for example arranged into a pattern. Such a pattern may generate a corresponding pattern in the glints, making eye tracking more accurate and/or ensuring lighting uniformity.

Figure 4C:
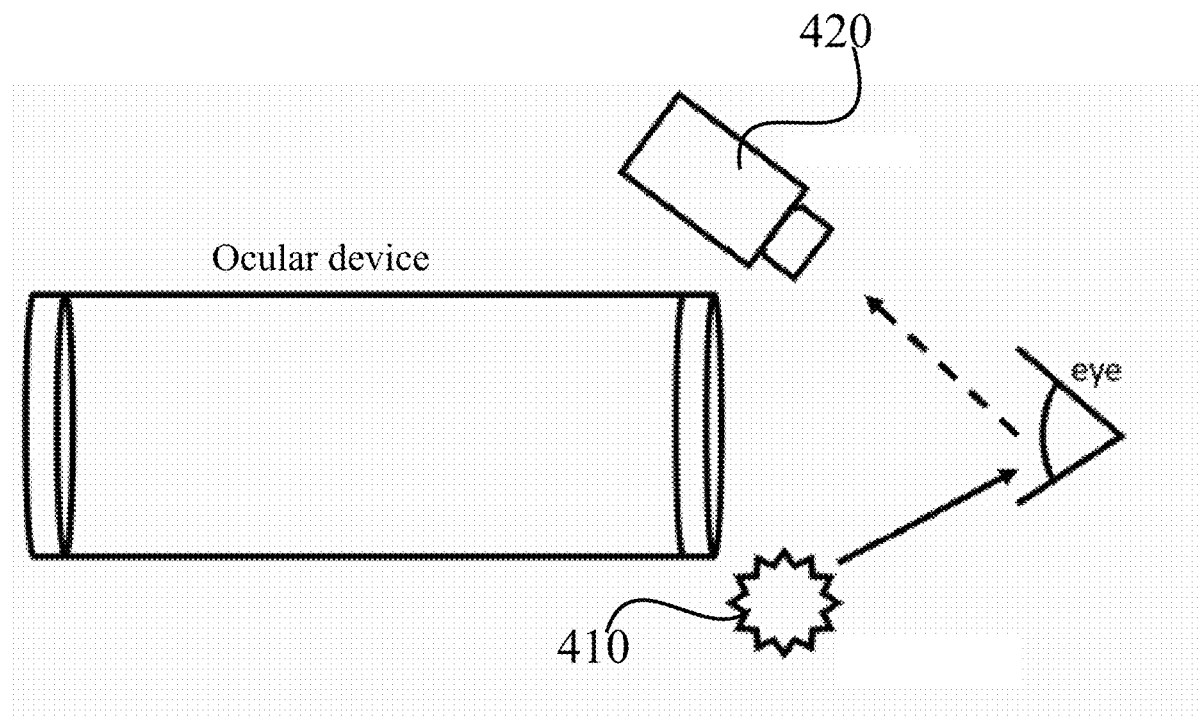

In the arrangement of FIG. 4C, the emitter 410 and the sensor 420 are both outside the enclosure of the optical device, at the eyepiece. In detail, the emitter and sensor are both outside the enclosure, and the sensor is configured to image the eye directly, and not via the ocular pathway of the ocular device. Benefits of this arrangement include that the eye-tracking hardware, the emitter and the sensor, may be made detachable and removable, and the ocular device itself may be made smaller than in FIG. 4A or FIG. 4B, as the reflector is not needed in the ocular pathway.

Figure 4D:
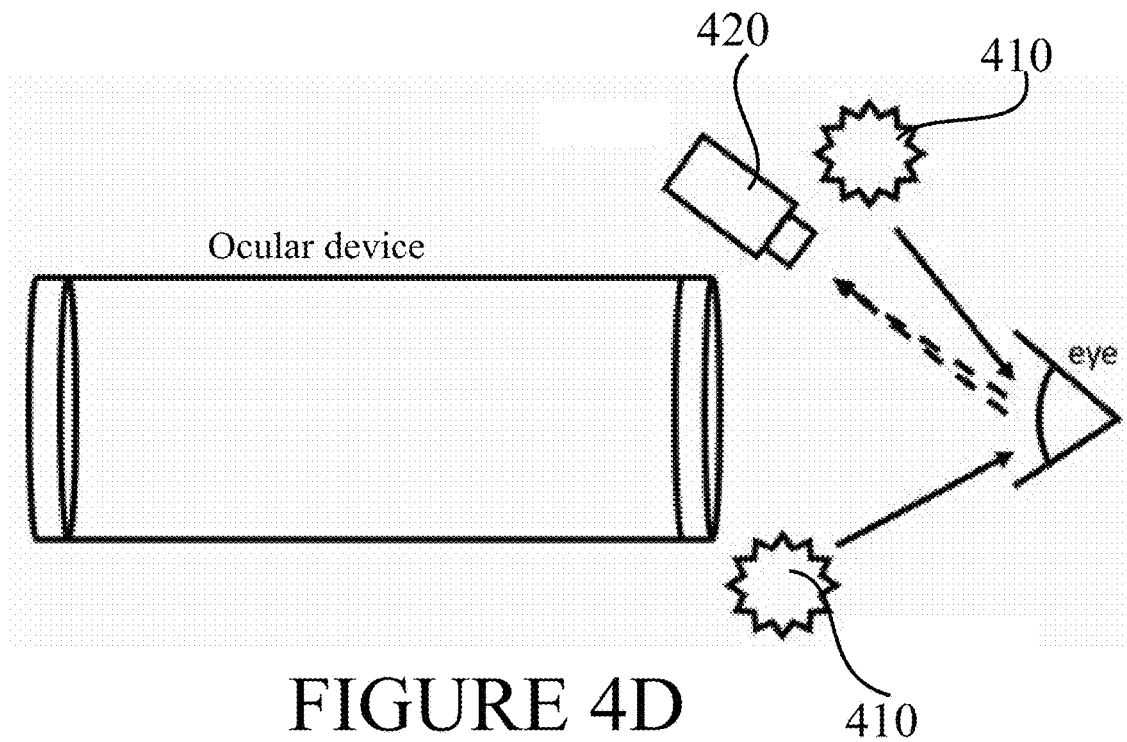

In the arrangement of FIG. 4D, the emitter 410 and the sensor 420 are both outside the enclosure of the optical device as in FIG. 4C. Additionally, there are two emitters 410, or two clusters of emitters 410 or two types of emitters. This provides the advantage compared to the situation of FIG. 4C, that glints on the user's eye's corneal surface may have a pattern which covers the corneal surface in a more comprehensive way, increasing accuracy of eye tracking based on imaging the glints and providing better illumination of the eye area, and/or enhancing designated optical features of an eye. As in FIG. 4C, the eye-tracking hardware may be made detachable and removable and the ocular device itself may be made smaller.

Figure 4E:
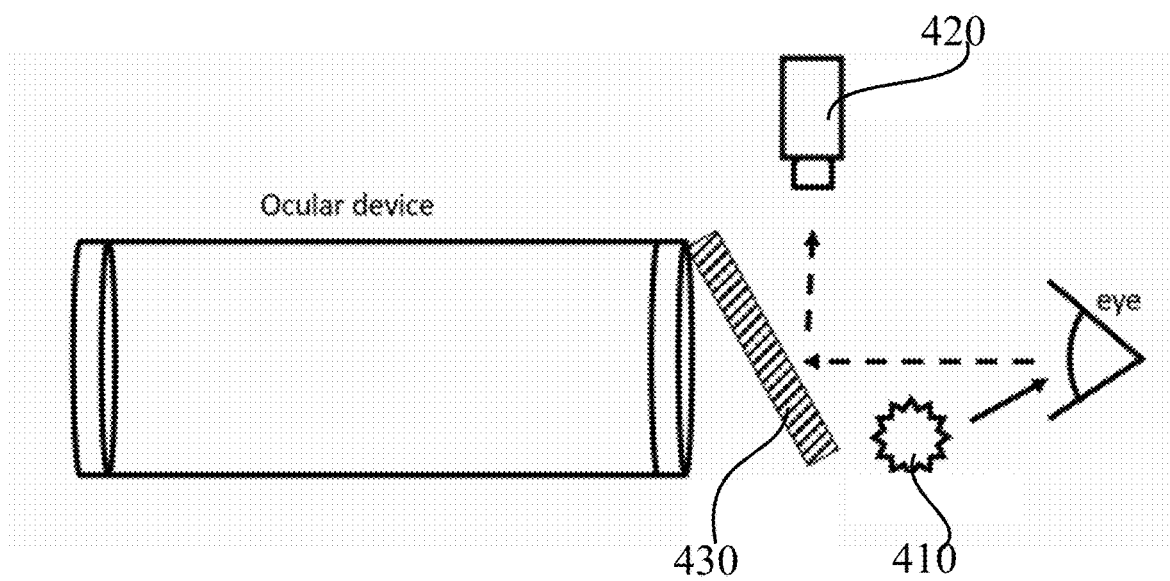

In the arrangement of FIG. 4E the emitter 410 and the sensor 420 are both outside the enclosure of the optical device as in FIGS. 4C and 4D. Further, a reflective element 430 is provided at the end of the ocular enclosure to reflect the glints on the corneal surface of the user's eye to sensor 420. Reflective element 430 may be transparent to visible light, and reflective in the wavelength band used by emitters 410. An advantage in using reflective element 430 placed at the end of the ocular enclosure is that sensor 420 may obtain an image of the corneal surface from a frontal perspective, which yields more information than the angled perspective of FIGS. 4C and 4D. The reflective element may be detachable along with emitter 410 and sensor 420.

Figure 4F:
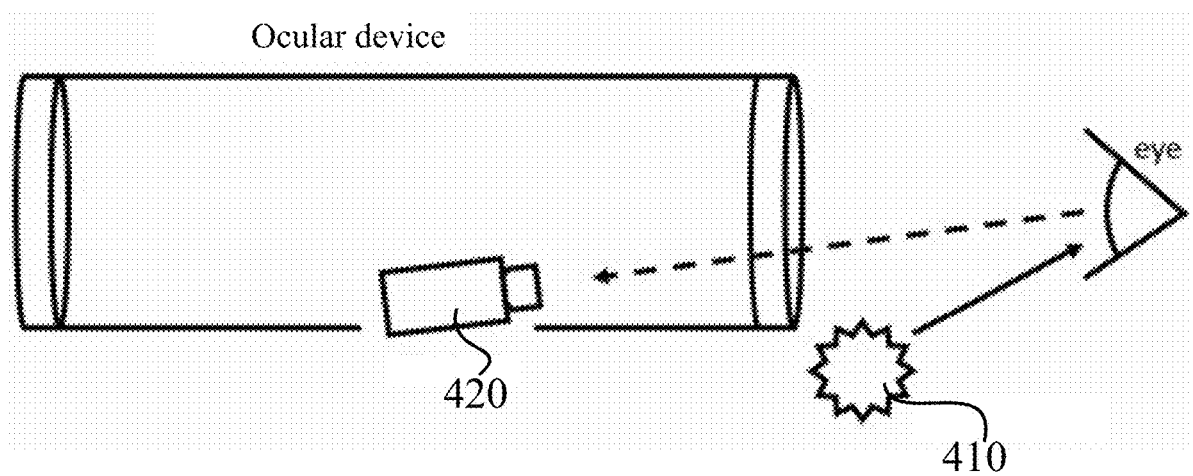

In the arrangement of FIG. 4F, emitter 410 is outside the enclosure, at the eyepiece, and sensor 420 is inside the enclosure, imaging the eye directly and not via a reflector. This provides the advantages that the sensor obtains a fairly direct perspective to the corneal surface, obtaining a good image of the glints on the corneal surface, and the reflector need not be provided on the ocular pathway. While a reflector is transparent in the visible wavelength range, it nonetheless inevitably has a slight effect on the quality of images seen through it, and may generate spurious reflections of outside light sources. Omitting the reflector also provides the benefit that the ocular pathway may be made simpler. The sensor 420 may be movable and may be rotatable inside the enclosure, so the user can move it closer to his eye when the eye is expected to be more stationary, to obtain more accurate images of the eye, and farther away when the eye is foreseen to move around more.

Figure 4G:
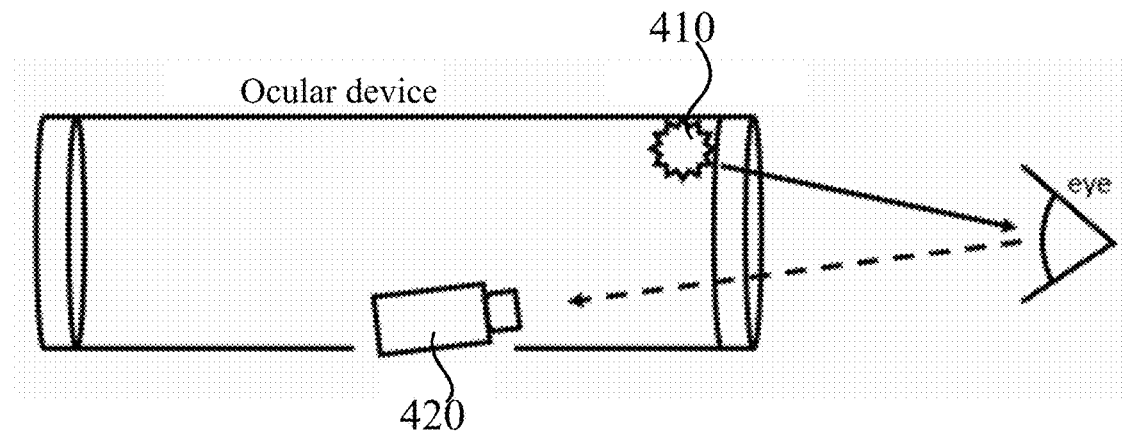

In the arrangement of FIG. 4G, both emitter 410 and sensor 420 are inside the ocular enclosure. The sensor 420 is configured to image the eye directly and not via a reflector. This provides the advantage that the ocular device is easily transportable, as it has no protruding gaze tracking elements. The device may also be used outdoors, as it has a simpler shape than in case the emitter and/or sensor were outside the enclosure. Further, the sensor obtains a fairly direct perspective to the corneal surface, obtaining a good image of the glints on the corneal surface, and the reflector need not be provided on the ocular pathway.

Figure 4H:
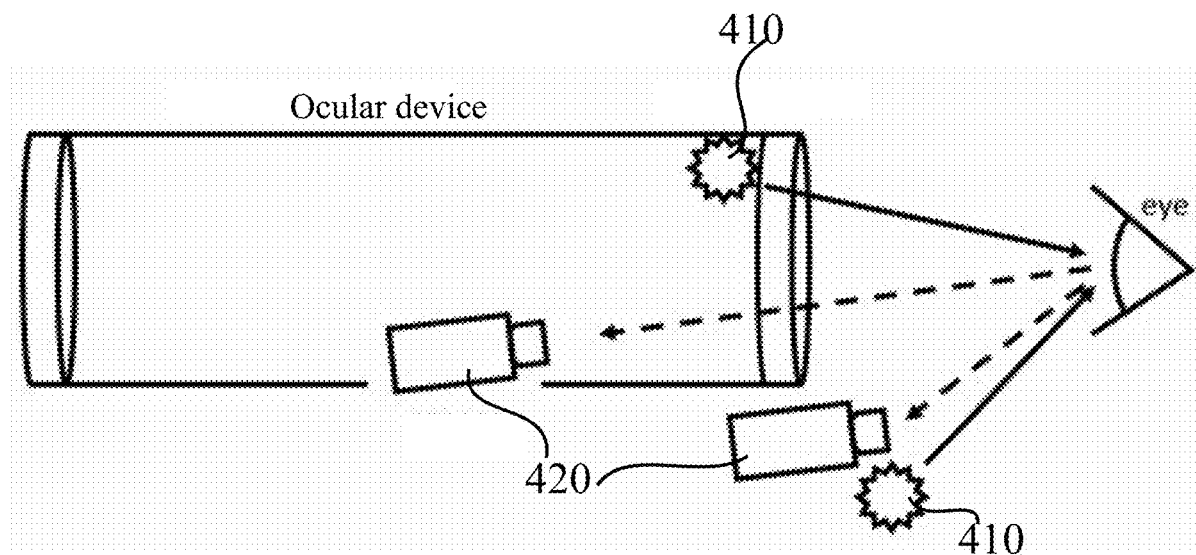

In the arrangement of FIG. 4H, an emitter 410 and sensor 420 are disposed as in FIG. 4G, and further another emitter 410 and another sensor 420 are in addition disposed, outside the ocular enclosure. This provides the advantage, that more variations of glints may be generated as there are two emitters 410, or two sets of emitters 410, and further, more information on the glints is obtained as the corneal surface is imaged from two different perspectives. The emitter and the sensor outside the enclosure may be detachable, and the device may be used as in FIG. 4G when they are detached. They may be attached, when a larger resolution and accuracy in eye tracking is used, and the user need not place the eye very close to the end of the ocular enclosure.

Figure 4I:
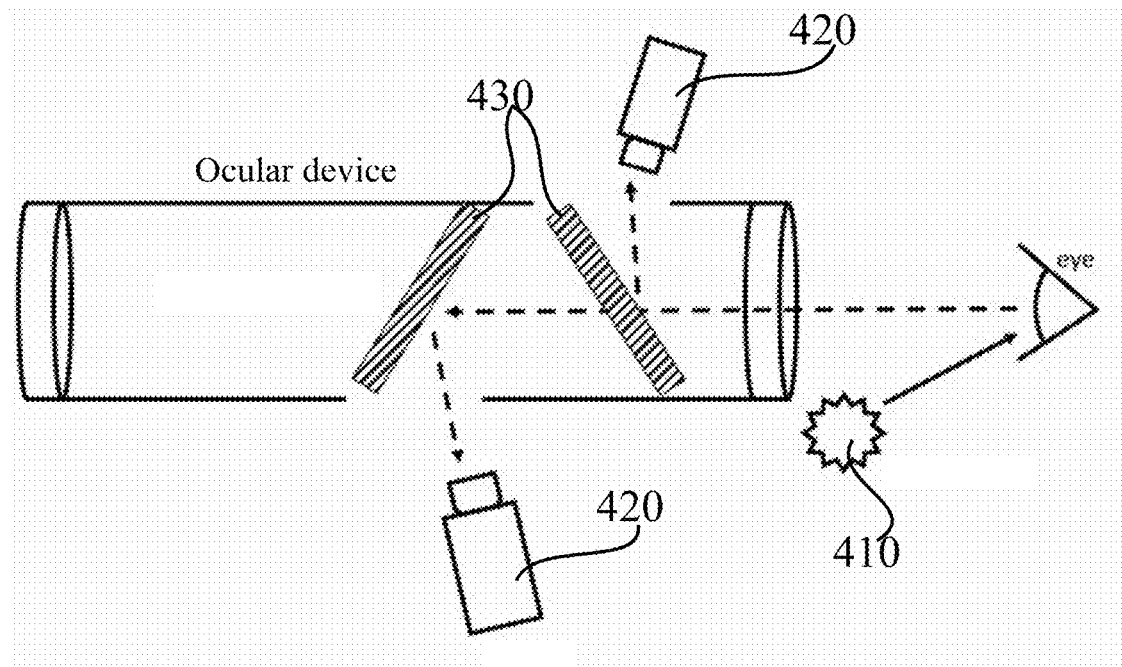

In the arrangement of FIG. 4I, an emitter 410 is disposed outside the ocular enclosure, at the eyepiece, and two sensors 420 are disposed outside the ocular enclosure. A first one of the sensors is configured to image the corneal surface via a first reflective element 430 in the ocular enclosure, on the ocular pathway, and second one of the sensors is configured to image the corneal surface via a second reflective element 430 in the ocular enclosure, on the ocular pathway, where each reflective element 430 may reflect light in different wavelengths and/or levels and its optical properties might be selected automatically or manually, for example by replacing the reflective element 430. The distances during use of the first and second ones of the sensors may each be independently selectable by the user or automatically. An advantage of this arrangement is that various portions of the eye can be captured by the two sensors, or the two sensors can provide stereographic information, allowing for 3D estimation of image features, and thus contribute to higher trackability and system robustness. Further, time-of-flight imaging technology may be used where two different emitters 410 are employed at different planes.

Figure 4J:
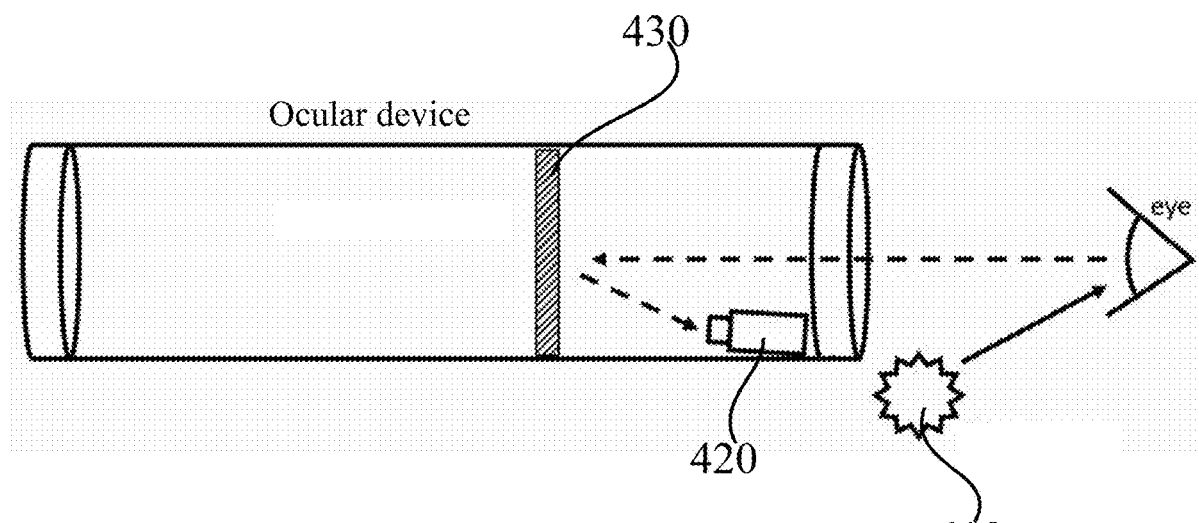

In the arrangement of FIG. 4J, an emitter 410 is disposed outside the ocular enclosure, at the eyepiece, and a sensor 420 is disposed inside the ocular enclosure, configured to image the eye of the user via a reflector in the ocular enclosure, on the ocular pathway. An advantage of this arrangement is that no external sensing elements, except the emitter 410, are visible and thus less prone to mechanical damage and that there is no physical component at the end of the ocular, except the emitter 410, which allows positioning of the eye within the exit pupil of the ocular device also for users wearing eye-wear. Another benefit of such configuration of a sensor 420 is facilitating the placing of a reflective element 430 at a common focal plane of an ocular device at the same time allowing for manual/automatic adjustments for eye/head/lens distance compensation.

Figure 4K:
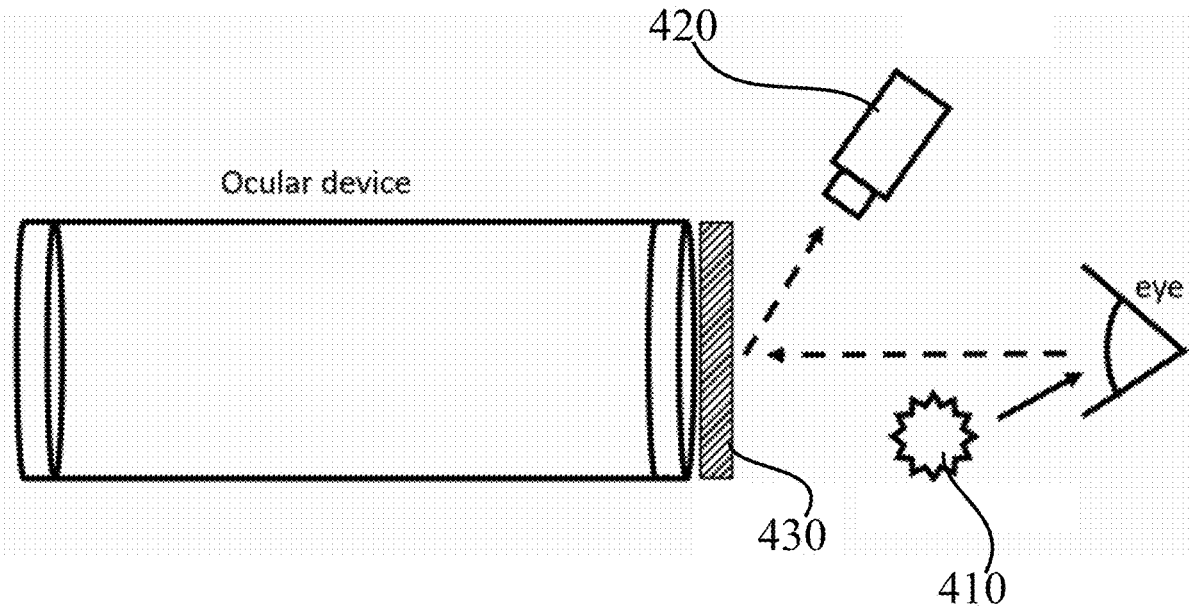

In the arrangement of FIG. 4K, an emitter 410 is disposed outside the ocular enclosure, at the eyepiece, and a sensor 420 is likewise disposed outside the ocular enclosure, at the eyepiece. A reflective element is arranged at the end of the ocular enclosure, covering the eyepiece of the ocular pathway, and having a nil or minimal angle with regard to the surface of the eye-piece, arranged to reflect the glints on the corneal surface to sensor 420. An advantage of this arrangement is that the physical space of the eye-tracking hardware is further reduced to allow comfortable usage of the ocular device. Further advantage includes reduced reflections of the specular and spurious light visible to the user. Further, the system does not limit a field-of-view, may be detachable, does not affect the optical properties of viewed objects, as angled reflectors 430 might. Further, the whole image may be kept in focus since the plane is parallel to the user's eye.

A benefit of placing the emitter(s) outside the enclosure, at the eyepiece, is that light from the emitter(s) need not traverse a lens on its way out which could blur the light. On the other hand, the enclosure need not be provided with additional opening(s) to allow the emitter(s) to illuminate the eye around the lens, as such opening(s) could leak light into the enclosure. Being outside the enclosure, at the eyepiece, means being placed outside the enclosure in the vicinity of the lens closest to the eye during use, as illustrated in the figures. In some embodiments, the emitter(s) comprise laser emitter(s), and the surface of the optical element, such as lens, closest to the user's eye may be used to reflect the IR laser light, from the emitter(s) to the eye to perform the illumination and generate the glints. In this sense, the direction of light may be the reverse of that in FIG. 4K.

Figure 4L:
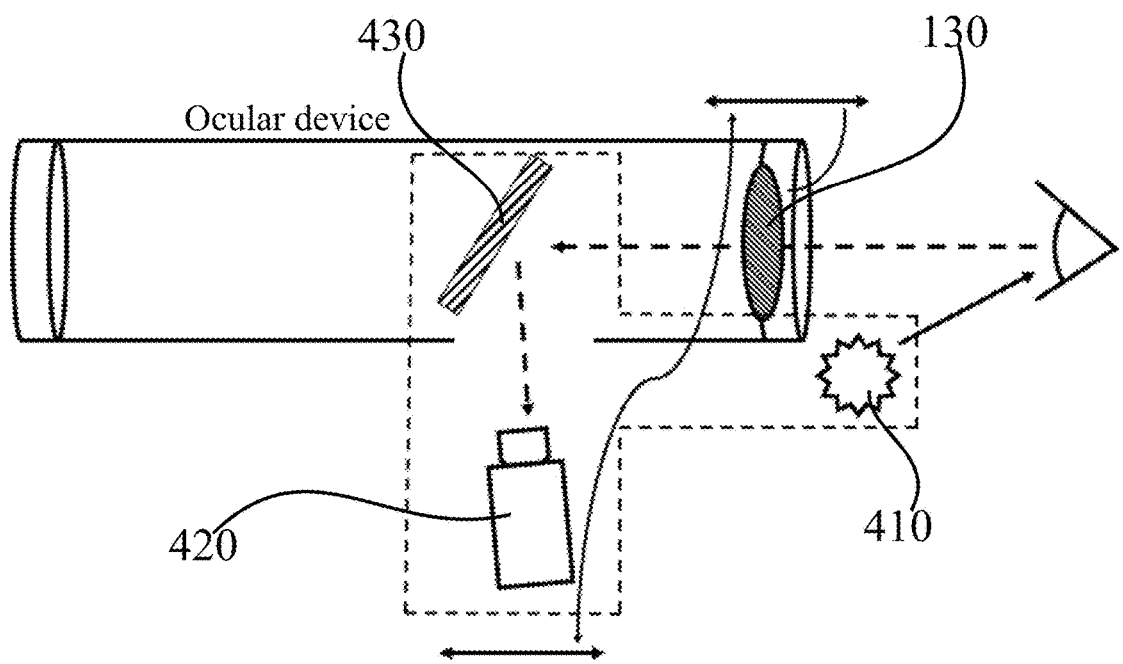

In the arrangement of FIG. 4L, an eye-tracking arrangement comprising the emitter 410, sensor 420 and reflector 430 is arranged to substantially co-move within the optical system with optical elements 130 of the ocular device. This provides the benefit that e.g. dioptre changes do not occur in the system between the eye and eye-tracking arrangement when the near-eye ocular device is adjusted, for example adjusted during use. Depending on the embodiment, it may be sufficient if at least one of emitter 410, sensor 420 and reflector 430 co-moved with optical elements 130 of the near-eye ocular device. In other words, in some embodiments, some or all parts of the eye tracking arrangement can be connected to the ocular device and co-move respectively with the optical element(s) 130 of the near-eye ocular device. For example, when some of the optical elements 130 of the ocular device move towards or away from the eye, at least one of the emitter 410, sensor 420 and reflector 430 moves to compensate the optical element's movement. The advantage of this embodiment is that it keeps the geometry of the eye tracking invariant to the adjustments of the near-eye ocular device.

In general, an ocular device as described herein may be configured to support the emitter(s) and/or the sensor(s) in more than one position, such that the user may place the emitter(s) and/or the sensor(s) to a position which is suitable for the kind of work she intends to perform, using the ocular device. For example, the emitter(s) and/or sensor(s) may be outside the ocular enclosure when working indoors, but places inside the enclosure when the user intends to use the ocular device outdoors, as the device is easier to handle and transport with no protruding gaze-tracking elements. Sensors(s) and emitter(s) may include light-polarizing elements when used in an eye-tracking system such as ones described herein, for example to improve performance outdoors.

At least some of the arrangements described above may allow for adjusting the optical pathway (diopter correction, possible zoom, adjusting interpupillary distance), and allowing for the relevant elements (lenses etc.) to move within the optical system, while moving with these parts so that the tracking of the eye performs optimally regardless of these adjustments. For instance, in microscopes, the last lens construct is typically rotated and thus moved along the optical axis to allow for adjusting diopter correction. Where applicable, the lighting elements and the camera may move with these parts while keeping the imaging arrangement suitable for tracking. The relative locations of the camera and the light sources may be fixed, or may be changeable in a manner that can be compensated for in device calibration. The camera may be non-rotatable and rather have a suitable imaging location in relation to the eye in various ones of the described arrangements.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in gaze tracking.

Acronyms List

AR augmented reality
IR infra-red
CCD charge-coupled device
CMOS complementary metal-oxide semiconductor
LED light emitting diode VR virtual reality
XR a VR environment

REFERENCE SIGNS LIST

100 Eye
110 Pupil
120 Microscope
130 Optical elements
140 Plate
150 Gaze targets
201 Emitter position
300-360 Structure of the device of FIG. 3
410 Emitter
420 Sensor

The invention claimed is:
1. An eye tracking arrangement configured to be operated with a near-eye ocular device which comprises an ocular pathway enclosed by an enclosure, comprising:

at least one light emitter, configured to illuminate an eye of a user to produce corneal glints on the eye when the user is using the near-eye ocular device, and at least one sensor configured to obtain an image of the eye of the user when the user is using the near-eye ocular device, the eye tracking arrangement is configured to be operated with the near-eye ocular device which allows, during use, movement of the user's head relative to the at least one sensor, and exactly one of:

the at least one light emitter is configured to be placed inside the enclosure during use and the at least one sensor is configured to be placed inside the enclosure during use, and the at least one light emitter is configured to be placed inside the enclosure during use and the at least one sensor is configured to be placed outside the enclosure during use, and further, the emitter is inside an optical element of the near-eye ocular device;

wherein an optimal placement of the least one sensor and the at least one emitter may be selected according to general geometry of the ocular device and viewing condition of whether the ocular device is used to view targets close to the user or further away.

2. The eye tracking arrangement according to claim 1, wherein the at least one light emitter is configured to be placed inside the enclosure during use and the at least one sensor is configured to be placed outside the enclosure during use, and eye tracking arrangement further comprises a reflective element configured to be placed in the enclosure to reflect an image of the eye to the at least one sensor.

3. The eye tracking arrangement according to any claim 1, wherein each of the at least one light emitter is an infra-red or near-infra-red light emitter.

4. The eye tracking arrangement according to claim 1, wherein the at least one light emitter comprises plural light emitters arranged into a pattern.

5. The eye tracking arrangement according to claim 1, wherein the at least one light emitter comprises at least one light emitter with a tuneable wavelength and radiant power of emitted light.

6. The eye tracking arrangement according to claim 1, wherein the at least one light emitter comprises plural light emitters, the plural light emitters comprising at least two subsets of light emitters, the subsets being independently controllable to be ON or OFF.

7. The eye tracking arrangement according to claim 1, further configured to determine a pupil size of the user.

8. The eye tracking arrangement according to claim 1, further configured to support the at least one light emitter in more than one first location, enabling selection of the first location of the at least one light emitter.

9. The eye tracking arrangement according to claim 1, further configured to support the at least one sensor in more than one second location, enabling selection of the second location of the at least one sensor.

10. The eye tracking arrangement according to claim 1, further comprising at least two sensors configured to image the eye.

11. The eye tracking arrangement according to claim 1, wherein location of the at least one light emitter relative to the at least one sensor is predefined.

12. The eye tracking arrangement according to claim 1, wherein the eye-tracking arrangement is configured to image and determine at least one of: an iris, iris colour, iris pattern, eyelids, eyelids characteristics, blink and blink characteristics.

13. The eye tracking arrangement according to claim 1, wherein at least one of the at least one emitter, the at least one sensor and a reflector comprised in the eye tracking arrangement is configured to co-move with optical elements of the near-eye ocular device, when the eye tracking arrangement is used with the near-eye ocular device.

14. The eye tracking arrangement according to claim 1, wherein the optical element is a lens.

* * * * *